(12) United States Patent
Queveau et al.

(10) Patent No.: US 7,165,792 B2
(45) Date of Patent: Jan. 23, 2007

(54) DEVICE FOR IMPROVING A VEHICLE STRUCTURAL RIGIDITY, IN PARTICULAR A VEHICLE WITH RETRACTABLE ROOF

(75) Inventors: Gérard Queveau, Le Pin (FR); Albéric Sorin, Le Pin (FR)

(73) Assignee: SEBA - Societe Europeenne de Brevets Automobiles, Paris (FR)

( * ) Notice: Subject to any disclaimer, the term of this patent is extended or adjusted under 35 U.S.C. 154(b) by 0 days.

(21) Appl. No.: 10/432,460

(22) PCT Filed: Nov. 21, 2001

(86) PCT No.: PCT/FR01/03668

§ 371 (c)(1),
(2), (4) Date: Dec. 4, 2003

(87) PCT Pub. No.: WO02/42104

PCT Pub. Date: May 30, 2002

(65) Prior Publication Data

US 2004/0070214 A1    Apr. 15, 2004

(30) Foreign Application Priority Data

Nov. 22, 2000  (FR) .................................. 00 15079

(51) Int. Cl.
*E05C 17/56* (2006.01)
*E05C 1/06* (2006.01)

(52) U.S. Cl. ....................... 292/251.5; 292/32; 292/92; 292/144; 292/177; 292/DIG. 54; 292/DIG. 65

(58) Field of Classification Search ............. 292/251.5, 292/DIG. 23, DIG. 65, 92, 177, 32, 144, 292/DIG. 54
See application file for complete search history.

(56) References Cited

U.S. PATENT DOCUMENTS 1,958,940 A * 5/1934 Cavanaugh et al. ......... 292/144
2,028,852 A * 1/1936 Vincent ....................... 70/262

(Continued)

FOREIGN PATENT DOCUMENTS

DE            4007348        *  2/1991

*Primary Examiner*—Brian E. Glessner
*Assistant Examiner*—Carlos Lugo
(74) *Attorney, Agent, or Firm*—Nawrocki, Rooney & Sivertson, P.A.

(57) ABSTRACT

Apparatus for improving the rigidity of a vehicle structure, and particularly a vehicle having a retractable roof. The apparatus includes an electromagnet carried by either an edge of a door of the vehicle that swings outwardly when the door is open, or by an opposing edge of bodywork of the vehicle which faces the edge of the door when the door is closed. The electromagnet serves as a first element which, when the door is closed, is positioned opposite a second element made of a magnetic material. One of the elements is able to move toward the other element when the electromagnet is provided with an electric current. One of the elements is provided with a protuberance formed in the shape of a truncated cone, and the other element is provided with an axially-aligned recess which has a size and shape to receive the protuberance therein.

2 Claims, 6 Drawing Sheets

U.S. PATENT DOCUMENTS

| | | | |
|---|---|---|---|
| 2,381,075 A * | 8/1945 | Nelsen | 335/261 |
| 2,514,927 A * | 7/1950 | Bernhard | 292/251.5 |
| 2,565,891 A * | 8/1951 | Sherman | 292/251.5 |
| 2,586,900 A * | 2/1952 | Alderman | 292/74 |
| 2,659,114 A * | 11/1953 | Anderson et al. | 49/504 |
| 2,694,592 A * | 11/1954 | Borchers et al. | 292/251.5 |
| 2,727,772 A * | 12/1955 | Hamilton | 292/144 |
| 2,765,648 A * | 10/1956 | Hatcher | 70/264 |
| 2,822,203 A * | 2/1958 | Griswold, Jr. et al. | 292/144 |
| 2,826,444 A * | 3/1958 | Kurilenko | 292/177 |
| 3,247,924 A * | 4/1966 | Price | 180/289 |
| 3,431,998 A * | 3/1969 | Martin | 180/281 |
| 3,468,392 A * | 9/1969 | Hass | 180/281 |
| 3,479,767 A * | 11/1969 | Lastinger et al. | 49/280 |
| 3,516,701 A * | 6/1970 | Graham | 292/144 |
| 3,753,316 A * | 8/1973 | Savarieau et al. | 49/31 |
| 3,830,332 A * | 8/1974 | Fontaine | 180/281 |
| 4,372,419 A * | 2/1983 | Barnett et al. | 180/289 |
| 4,784,415 A * | 11/1988 | Malaval | 292/144 |
| 4,915,431 A * | 4/1990 | Bailey | 292/251.5 |
| 4,941,235 A * | 7/1990 | Aoki | 24/303 |
| 5,029,912 A * | 7/1991 | Gotanda | 292/143 |
| 5,263,347 A * | 11/1993 | Allbaugh et al. | 70/257 |
| 5,386,713 A * | 2/1995 | Wilson | 70/280 |
| 5,588,318 A * | 12/1996 | Osborne | 70/469 |
| 5,727,288 A * | 3/1998 | Byon | 16/254 |
| 6,007,119 A * | 12/1999 | Roth et al. | 292/251.5 |
| 6,260,892 B1 * | 7/2001 | Chang | 292/251.5 |
| 6,412,584 B1 * | 7/2002 | Faigle et al. | 180/282 |
| 6,561,555 B1 * | 5/2003 | Millard | 292/251.5 |
| 6,634,684 B1 * | 10/2003 | Spiessl | 292/341.16 |

* cited by examiner

DEVICE FOR IMPROVING A VEHICLE STRUCTURAL RIGIDITY, IN PARTICULAR A VEHICLE WITH RETRACTABLE ROOF

A device for improving the stiffness of the structure of a vehicle, in particular a vehicle with a retractable roof The present invention concerns a device for reinforcing a vehicle, in particular one equipped with a retractable roof.

It is known that vehicles of the cabriolet type or vehicles with a retractable roof, when the roof elements are stored in the vehicle boot, have stiffness in flexion and torsion, and resistance to lateral impacts, which are reduced compared with those of a vehicle with a non-retractable rigid roof.

This is because the rigid roof, as well as the lateral uprights, significantly participate in the stiffness of the bodywork.

The above problem is posed in particular in the case of vehicles with four doors equipped with a retractable roof.

This is because, in these vehicles, the bottom longitudinal members of the chassis have greater length than in vehicles with two doors and because of this these longitudinal members no longer provide sufficient torsional and flexional strength.

Moreover, in this type of vehicle, the only connection existing between the rear edge of each door and the bodywork is that existing at the single lock.

Naturally, this single lock procures no resistance to twisting forces.

The aim of the present invention is to remedy the above drawbacks.

According to the invention, the device for reinforcing a vehicle, in particular one equipped with a retractable roof, is characterised in that it comprises, between the rear edge of the vehicle door and the adjacent edge of the bodywork of the said vehicle, at least one first element comprising an electromagnet fixed to one of the said edges and, opposite the said electromagnet, at least one second element comprising a magnetic material fixed to the other edge, one of the said first and second elements being able to move towards the other element when the electromagnet is supplied with an electric current, the facing ends of the said elements being shaped so as to be able to fit axially one in the other.

The device preferably comprises at least two first elements each comprising an electromagnet and at least two second elements, disposed on the said facing edges, on each side of the lock which is normally fitted to the said edge of the door.

This arrangement of magnetic locking elements on each side of the central lock creates a rigid connection between the door and the bodywork which improves the resistance of the structure to twisting forces.

Other particularities and advantages of the invention will also emerge from the following description.

In the accompanying drawings, given by way of non-limiting examples:

Figure 1:
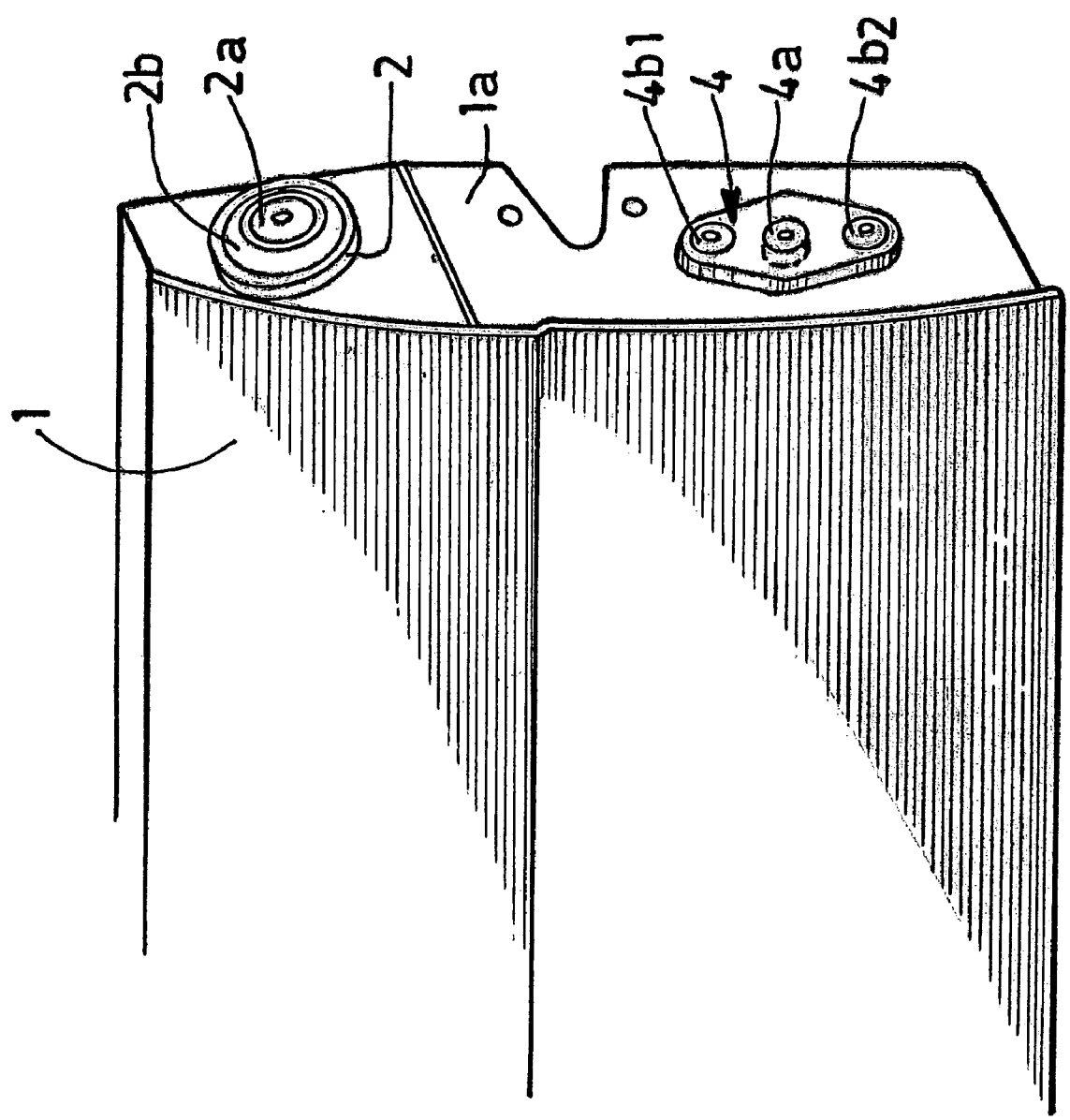
FIG. 1 is a partial perspective view of a vehicle door equipped with part of the device according to the invention.
Figure 2:
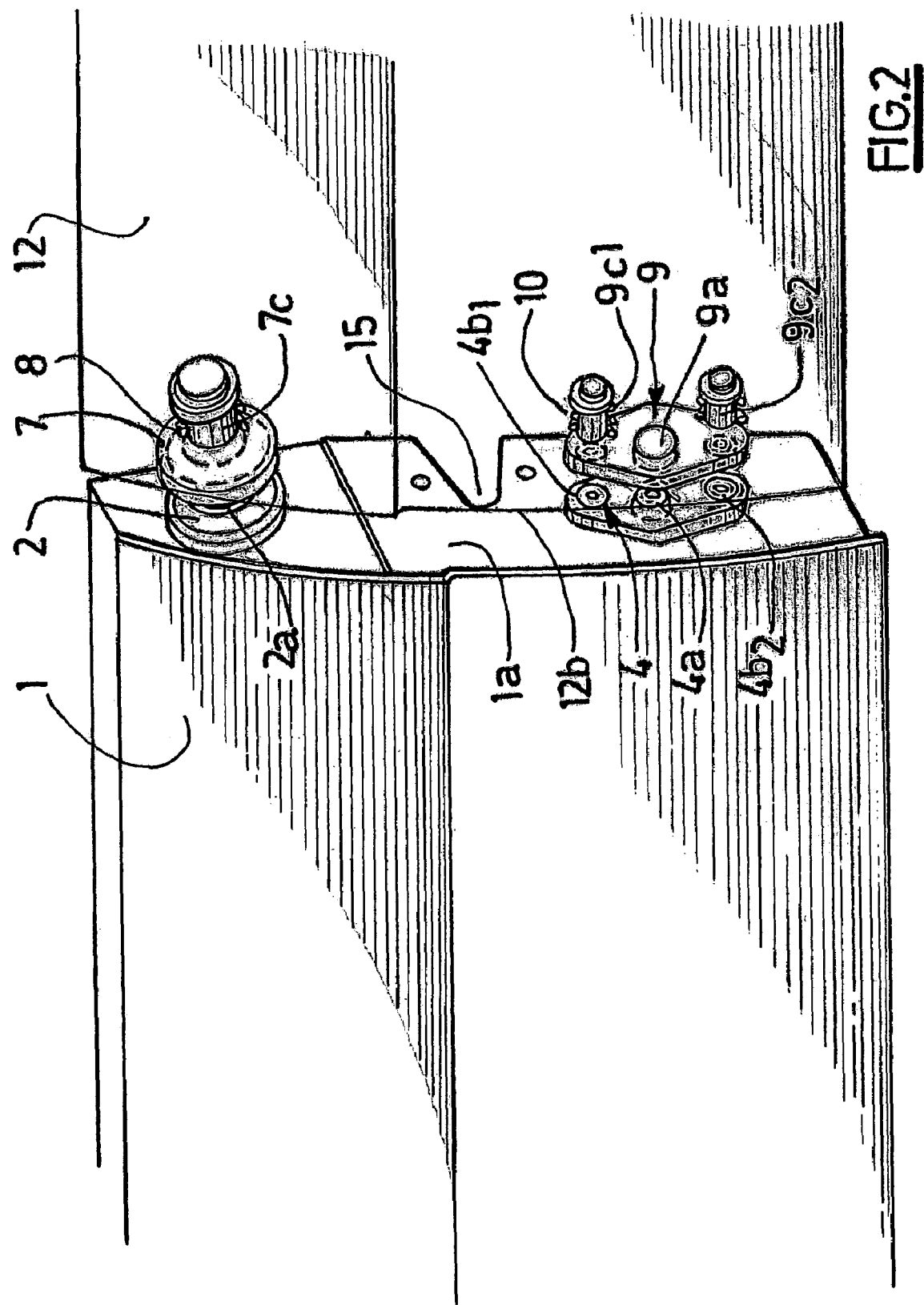
FIG. 2 is a view similar to FIG. 1, also showing the part of the bodywork which comprises the other part of the device according to the invention, this device being unlocked.

In the embodiment depicted in FIGS. 1 to 7, the device for improving the stiffness of the structure of a vehicle comprises, between the edge 1a of the vehicle door 1 and the adjacent edge 12b of the vehicle bodywork 12, at least one first element 2 comprising an electromagnet 2a fixed to one of the said edges 1a, 12b and opposite the said first element 2 at least one second element 7 fixed to the other edge 12b, 1a and comprising, opposite the electromagnet 2a, a magnetic material 7a.

Figure 3:
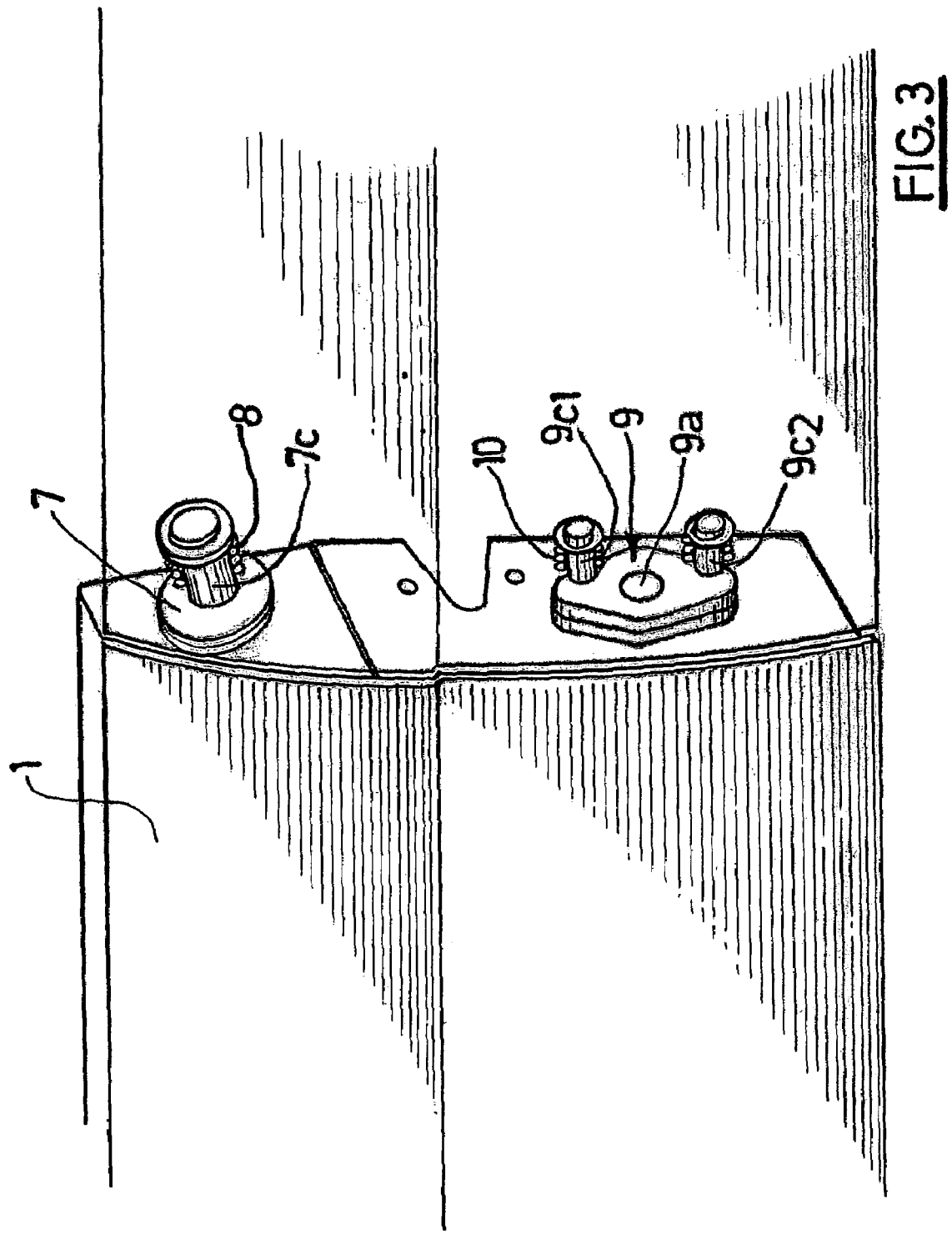
FIG. 3 is a view similar to FIG. 2, the device being locked.
Figure 5:
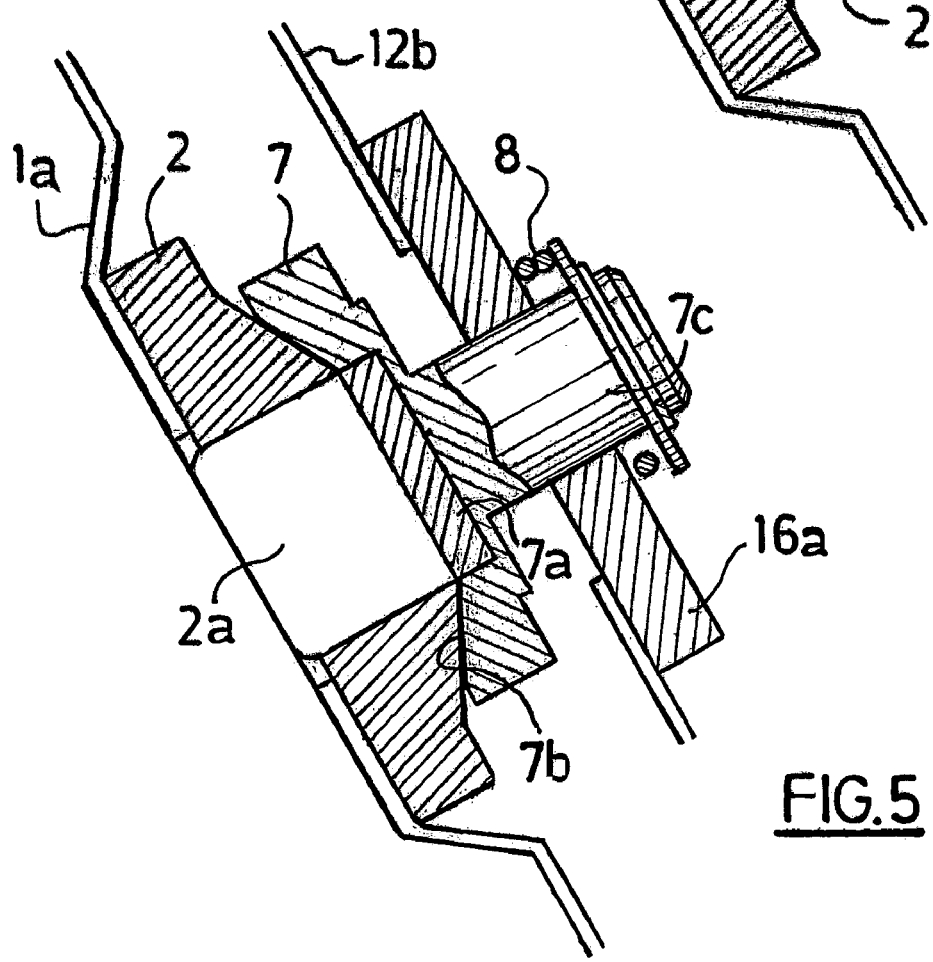
FIG. 5 is a view similar to FIG. 4 showing the device in the locked position.
Figure 6:
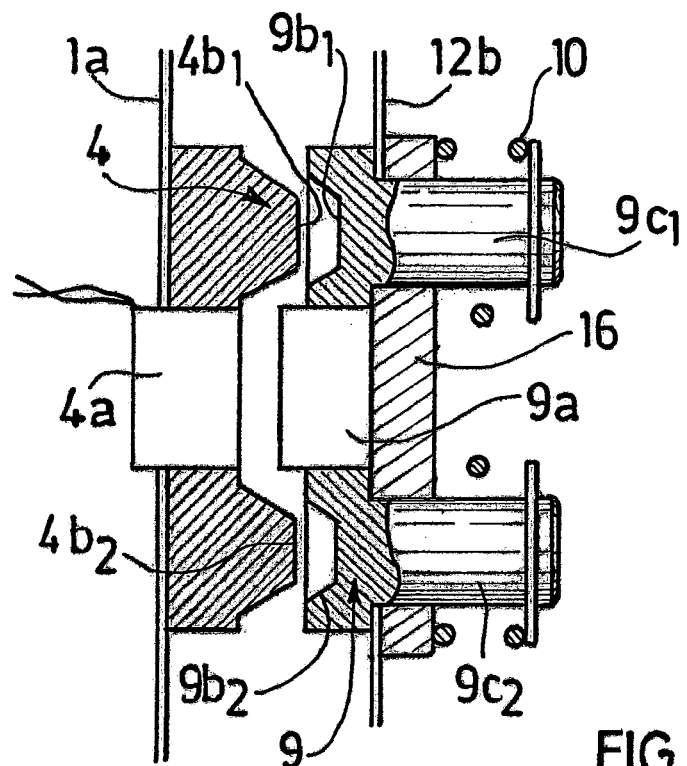
FIG. 6 is a view similar to FIG. 4, showing the locking device equipping the bottom part of the door, in the unlocked position.

One of the said first and second elements 2, 7 is able to move towards the other element 7, 2 when the electromagnet 2a is supplied with an electric current (see FIGS. 3 and 5).

Figure 4:
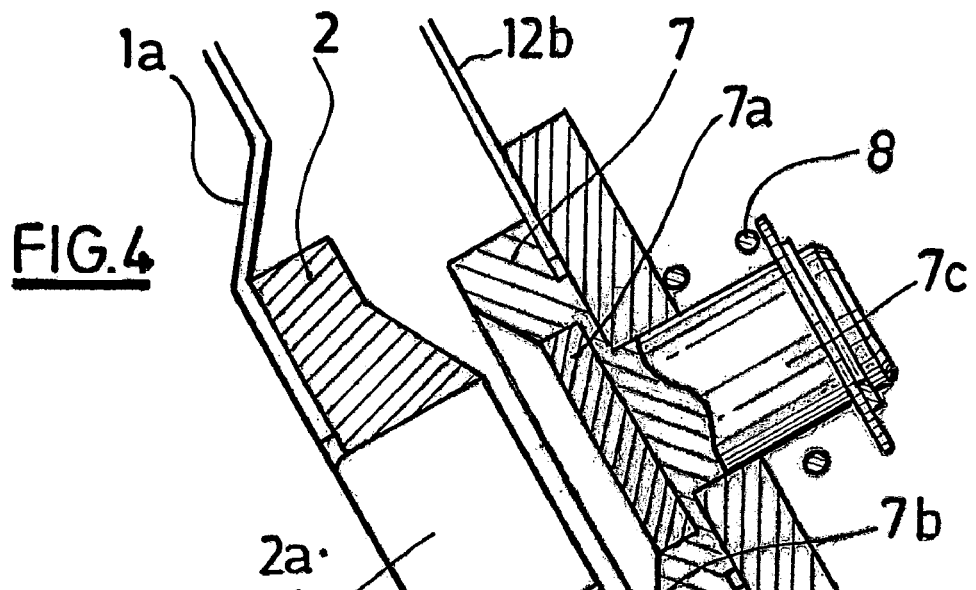
FIG. 4 is a view in partial longitudinal section of a device according to the invention in the unlocked position, equipping the top part of the door.

As shown by FIGS. 4 and 5, surfaces 2b, 7b, opposing engagable surfaces of elements 2, 7, are formed so as to be able to fit axially one in the other.

In the example depicted, the device comprises at least two first elements 2, 4 each comprising an electromagnet 2a, 4a and at least two second elements 7, 9 disposed on the said facing edges 1a, 12b on each side of the lock 15 which is normally fitted to the edge 1a of the door.

In addition, in the example depicted, the first elements 2, 4 are secured fixedly to the edge 1a of the door 1 and the second elements 7, 9 are secured slidably to the edge 12b of the bodywork.

In addition, the end of the first elements 2, 4 has a protuberance 2b, 4b1, 4b2 in the form of a truncated cone and the end of the second elements 7, 9 has a cavity with a complementary shape 7b, 9b1, 9b2.

It can also be seen, in particular in FIGS. 4, 5 and 6, 7 that the second elements 7, 9 each comprise a part 7c, 9c1, 9c2 mounted slidably in the edge 12b of the bodywork counter to the action of a return spring 8, 10.

In addition, these second elements 7, 9 are slidably mounted in a reinforcement plate 16a, 16 fixed to the edge 12b of the bodywork.

In the example depicted, the device situated at the bottom part comprises in fact two protuberances 4b1, 4b2 which cooperate with two complementary cavities 9b1, 9b2.

Figure 8:
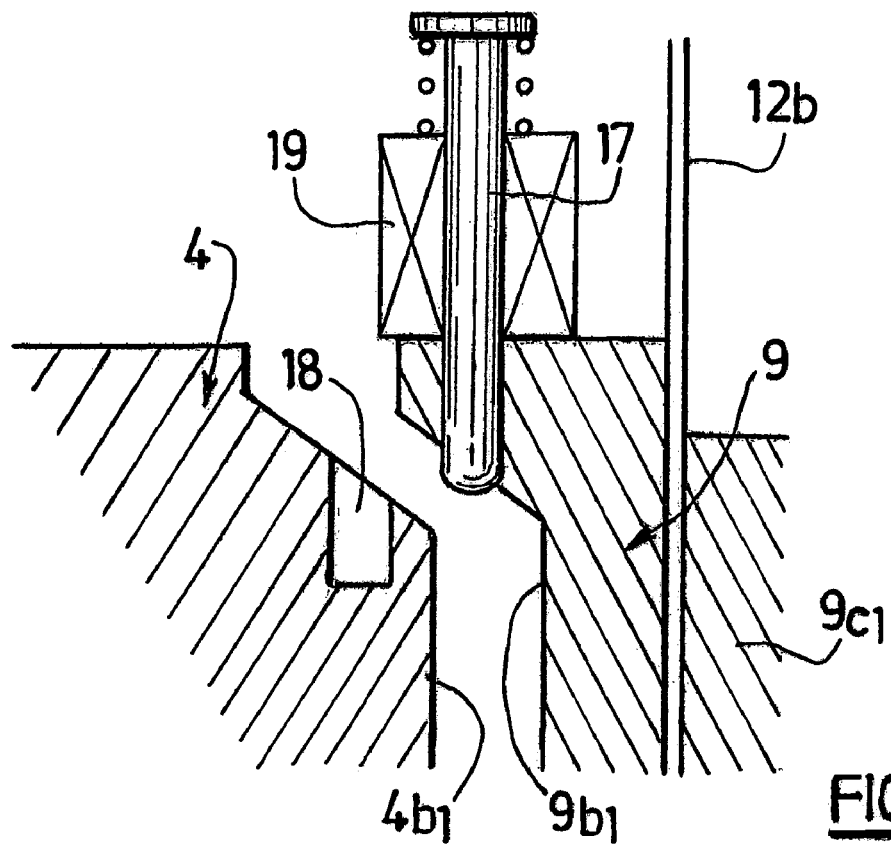
FIG. 8 is a view in partial section of a device equipped with a supplementary locking means, in the unlocked position.
Figure 9:
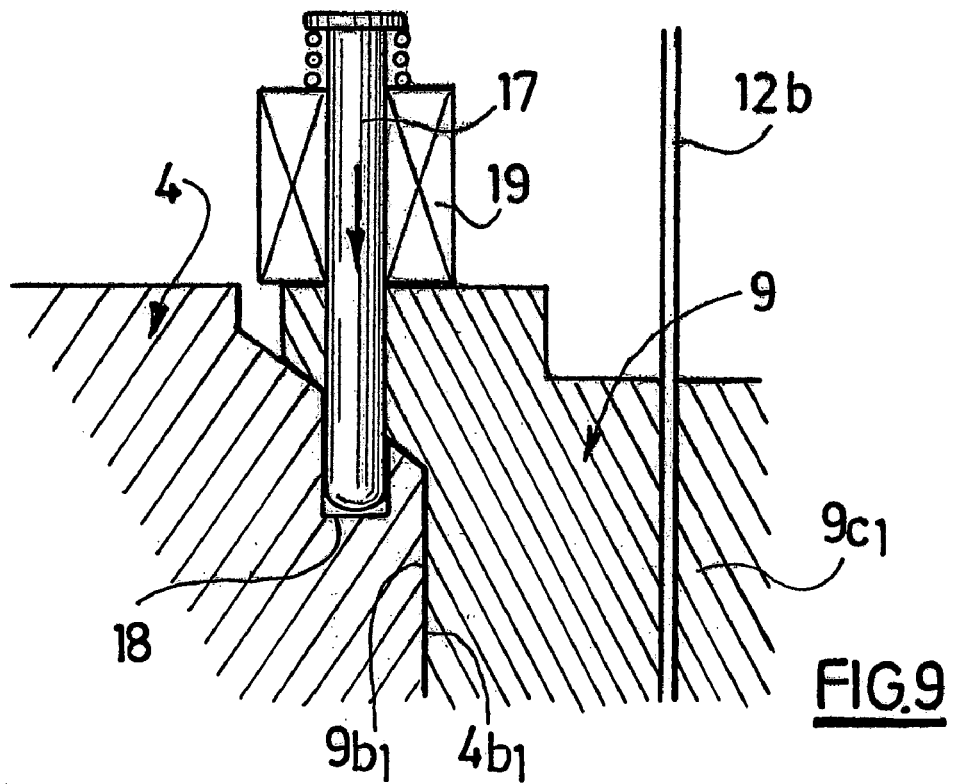
FIG. 9 is a view similar to FIG. 8, the device being in the locked position.

In the example in FIGS. 8, 9, the elements 4, 9 cooperate with means for locking them axially, when the ends of these elements 4, 9 are fitted one in the other.

These locking means comprise a finger 17 fixed to the end of the movable element 9, able to engage in an opening 18 formed in the end of the fixed element 4 when the ends of these elements 4, 9 are fitted one in the other, as shown by FIG. 9.

In the example depicted in FIGS. 8 and 9, the finger 17 is able to move towards the locked position under the action of an electromagnet 19. A return spring 20 makes it possible to move the finger 17 towards the unlocked position when the electrical supply to the electromagnet is interrupted.

Naturally locking systems other than the one depicted can be used.

Thus the locking system described in French patent application No. 0013242 in the name of the applicant could be used.

The functioning of the device which has just been described will now be explained.

Figure 7:
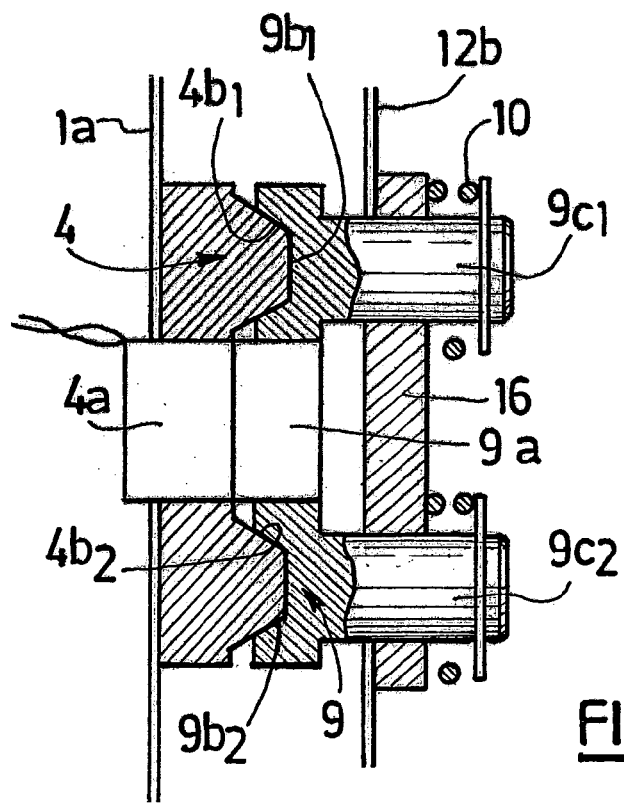
FIG. 7 is a view similar to FIG. 6 showing the device in the locked position.

After the door is closed, the electrical supply to the electromagnets 2a, 4a is demanded. The electromagnet field created by the electromagnets attracts the magnetic slugs 7a, 9b of the movable elements 7, 9. The ends 7b, 9b1, 9b2 of these movable ends 7, 9 fit on the protuberances 2b, 4b1, 4b2 of the fixed elements 2, 4, as shown by FIGS. 5 and 7.

By virtue of the locking thus obtained, distributed on each side of the central lock, the door 1 is rigidly connected to the bodywork, which improves the stiffness of the structure.

This stiffness is improved still further by virtue of the supplementary locking depicted in FIGS. 8 and 9, which enables the structure better to resist the bending and twisting forces, as well as lateral impacts.

In order to open the door 1, it suffices to cut off the electrical supply to the electromagnets 2a, 4a. The return springs 8, 10 return the movable elements 7, 9 to the unlocked position.

In the event of impact, a device can be provided for automatically cutting off the electrical supply to the electromagnets 2a, 4a in order to be able to open the door.

The invention claimed is:

1. A device improving the stiffness of structure of a vehicle, in particular a vehicle with a retractable roof, characterised in that it comprises, between a rear edge (1a) of a vehicle door (1) and an adjacent edge (12B) of bodywork (12) of said vehicle, at least one first element (2) comprising an electromagnet (2a) fixed to one (1a) of said edges and, opposite said electromagnet, at least one second element (7) comprising a magnetic material (7a) fixed to the other edge, one of said first (2) and second (7) elements being able to move towards the other element when the electromagnet (2a) is supplied with an electric current, facing ends (2b, 7b) of said element (2, 7) being shaped so as to be able to fit axially one in the other, further characterised in the end of the first element or elements (2, 4) has a protuberance in the form of a truncated cone (2b, 4b) and the end of the second element or elements (7, 9) has a cavity with a complementary shape (7b, 9b, and further characterised in that said first and second elements (2, 4, 7, 9) cooperate with reciprocally movable mechanical means for locking, thereby making it possible to lock them axially on each other when the ends of said elements are fitted one in the other, being further characterised in that the said means comprise a finger (17) secured to one (9) of the elements able to engage in an opening (18) formed in the other element (4), when the ends of the said elements are fitted one in the other.

2. A device according to claim 1, characterised in that the said finger (17) is able to move under the action of an electromagnet (19).

* * * * *